(12) United States Patent
Li et al.

(10) Patent No.: US 10,759,370 B2
(45) Date of Patent: Sep. 1, 2020

(54) VEHICLE ENERGY ABSORBING DEVICE

(71) Applicant: Ford Global Technologies, LLC, Dearborn, MI (US)

(72) Inventors: Yali Li, Saline, MI (US); Mohammad Omar Faruque, Ann Arbor, MI (US); James Chih Cheng, Troy, MI (US); Saeed David Barbat, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 15/956,163

(22) Filed: Apr. 18, 2018

(65) Prior Publication Data

US 2019/0322234 A1 Oct. 24, 2019

(51) Int. Cl.
| | |
|---|---|
| *B60R 21/045* | (2006.01) |
| *F16F 7/12* | (2006.01) |
| *B60R 21/017* | (2006.01) |
| *B60R 21/015* | (2006.01) |
| *B60R 21/00* | (2006.01) |
| *B60R 21/01* | (2006.01) |

(52) U.S. Cl.
CPC .......... *B60R 21/045* (2013.01); *B60R 21/017* (2013.01); *B60R 21/01516* (2014.10); *B60R 21/01538* (2014.10); *F16F 7/122* (2013.01); *B60R 2021/0051* (2013.01); *B60R 2021/01252* (2013.01)

(58) Field of Classification Search
CPC ............ B60R 21/045; B60R 21/01516; B60R 21/01538; B60R 21/017; B60R 2021/0051; B60R 2021/01252; B60R 21/00; F16F 7/122

USPC .......... 180/271; 188/371; 280/735, 752, 754
See application file for complete search history.

(56) References Cited

U.S. PATENT DOCUMENTS

| | | | | |
|---|---|---|---|---|
| 3,930,665 | A * | 1/1976 | Ikawa ................... | B60R 21/045 280/751 |
| 4,427,215 | A * | 1/1984 | Weichenrieder ...... | B60R 21/045 180/90 |
| 6,158,771 | A * | 12/2000 | Nusser ................ | B60R 13/0225 280/752 |
| 6,447,478 | B1 * | 9/2002 | Maynard ................ | F03G 7/065 600/151 |
| 6,945,559 | B2 * | 9/2005 | Kassman .............. | B60R 21/239 280/735 |
| 7,350,851 | B2 * | 4/2008 | Barvosa-Carter .......................... | B60N 2/42709 296/187.02 |
| 7,762,577 | B2 * | 7/2010 | Kato ....................... | B60R 21/02 280/730.1 |

(Continued)

FOREIGN PATENT DOCUMENTS

| | | |
|---|---|---|
| CN | 103318120 A | 9/2013 |
| DE | 102014214963 A1 | 2/2016 |

*Primary Examiner* — Paul N Dickson
*Assistant Examiner* — Hilary L Johns
(74) *Attorney, Agent, or Firm* — Frank A. MacKenzie; Bejin Bieneman PLC (57) ABSTRACT

An instrument panel assembly includes a support beam and an exterior panel. The instrument panel assembly includes an energy absorbing device between the support beam and the exterior panel and having a variable crush resistance based on a temperature of the energy absorbing device. The instrument panel assembly includes a heater operatively coupled to the energy absorbing device.

17 Claims, 8 Drawing Sheets

(56) References Cited

U.S. PATENT DOCUMENTS

| | | | |
|---|---|---|---|
| 7,874,576 B2 | 1/2011 | Gandhi | |
| 8,047,572 B2 * | 11/2011 | Carter | B60R 21/04 |
| | | | 280/751 |
| 8,181,991 B2 * | 5/2012 | Dei | B60K 37/00 |
| | | | 280/752 |
| 8,267,428 B2 * | 9/2012 | DePue | B60R 21/02 |
| | | | 280/751 |
| 8,356,836 B2 * | 1/2013 | Taracko | B60R 21/045 |
| | | | 280/748 |
| 9,550,466 B2 * | 1/2017 | Gandhi | B60R 21/0428 |
| 2003/0183466 A1 * | 10/2003 | Thayer | F16F 7/122 |
| | | | 188/371 |
| 2004/0195815 A1 * | 10/2004 | Browne | B60R 21/04 |
| | | | 280/753 |
| 2005/0158573 A1 * | 7/2005 | Elzey | C22F 1/006 |
| | | | 428/593 |
| 2009/0277169 A1 * | 11/2009 | Usoro | F03G 7/065 |
| | | | 60/527 |
| 2009/0278363 A1 * | 11/2009 | Browne | B60R 19/40 |
| | | | 293/118 |
| 2010/0320705 A1 * | 12/2010 | Rodenbeck | B60G 17/08 |
| | | | 280/5.515 |
| 2011/0148071 A1 * | 6/2011 | Battlogg | B60R 22/28 |
| | | | 280/286 |
| 2014/0090937 A1 * | 4/2014 | Wereley | B64C 27/51 |
| | | | 188/267.2 |
| 2015/0251617 A1 * | 9/2015 | Gandhi | B60R 21/0428 |
| | | | 188/377 |

* cited by examiner

VEHICLE ENERGY ABSORBING DEVICE

BACKGROUND

A vehicle may house occupants of various sizes. Structures of the vehicle, such as an instrument panel, may deform to control kinematics of an occupant of a front seat, e.g., during a vehicle impact. A relatively large occupant may benefit from a stiffer instrument panel that absorbs more energy for a certain amount of deformation of the instrument panel, and a relatively small occupant may benefit from a softer instrument panel that absorbs less energy for the same amount of deformation of the instrument panel.

For example, the instrument panel may include structural components, e.g., beams, and coverings on the structural components, e.g., a knee bolster. The knee bolster is often made of padded structures to absorb energy during a vehicle impact when a knee of an occupant impacts the knee bolster. In such an example, a relatively stiff knee bolster may absorb relatively more energy prior to abutting the structural component, and thus is beneficial for a relatively large occupant. However, this relatively stiff knee bolster is not as easily deformed by a relatively small occupant. The relative small occupant benefits from a relatively soft knee bolster that allows for more deformation at the lower impact forces applied by the small occupant.

DETAILED DESCRIPTION

An instrument panel assembly includes a support beam and an exterior panel. The instrument panel assembly includes an energy absorbing device between the support beam and the exterior panel and having a variable crush resistance based on a temperature of the energy absorbing device. The instrument panel assembly includes a heater operatively coupled to the energy absorbing device.

The heater may include a power source in electrical communication with the energy absorbing device.

The heater may include a resistor embedded in the energy absorbing device.

The heater may include a resistor supported by the energy absorbing device.

The energy absorbing device may include a corrugated member.

The energy absorbing device may include a first panel fixed to the support beam, a second panel fixed to the exterior panel and spaced from the first panel, and a material having variable crush resistance based on a temperature of the energy absorbing device between the first panel and the second panel.

The first panel and the second panel may be electrically conductive and the heater may be in electrical communication with the first panel and the second panel.

The instrument panel assembly may include a shaft extending from the exterior panel to the support beam through the energy absorbing device.

The crush resistance of the energy absorbing device may be inversely proportional to the temperature of the energy absorbing device.

A vehicle includes a support beam and an exterior panel. The vehicle includes an energy absorbing device between the support beam and the exterior panel and having a variable crush resistance based on a temperature of the energy absorbing device. The vehicle includes a processor and a memory storing instructions executable by the processor to heat the energy absorbing device based on a detected size of an occupant seated in front of the exterior panel.

The vehicle may include an occupancy sensor in communication with the processor and configured to detect a size of an occupant seated in front of the exterior panel.

The vehicle may include a heater in communication with the processor and operatively coupled to the energy absorbing device.

The memory may store instructions executable by the processor to actuate the heater to heat the energy absorbing device to a first temperature upon detecting an occupant having a first size, and to actuate the heater to heat the energy absorbing device to a second temperature that is greater than the first temperature upon detecting an occupant having a second size that is less than the first size.

The support beam may be elongated along a cross-vehicle axis.

The vehicle may include a seat in front of the exterior panel.

The vehicle may include a weight sensor in communication with the processor and supported by the seat.

The exterior panel may be below a beltline.

The vehicle may include a steering column, and the exterior panel may be below the steering column.

With reference to the Figures, wherein like numerals indicate like parts throughout the several views, an instrument panel 20 for a vehicle 22 includes a support beam 24 and an exterior panel 26. The instrument panel 20 includes an energy absorbing device 28, 128 between the support beam 24 and the exterior panel 26 and having a variable crush resistance based on a temperature of the energy absorbing device 28, 128. The instrument panel 20 includes a heater 30 operatively coupled to the energy absorbing device 28, 128.

The heater 30 actuates to heat the energy absorbing device 28, 128, reducing an amount of force required to crush the energy absorbing device 28. A computer 32 may actuate the heater 30 based on a detected size of an occupant 34 seated in front of the exterior panel 26, e.g., such that during a vehicle impact the energy absorbing device 28 may absorb more energy in the case of a larger occupant and less energy in the case of a smaller occupant.

The vehicle 22 may be any passenger or commercial automobile such as a car, a truck, a sport utility vehicle, a crossover vehicle, a van, a minivan, a taxi, a bus, etc.

The vehicle 22 defines a vehicle-longitudinal axis A1, i.e., extending between a front and a rear of the vehicle 22. The vehicle 22 defines a cross-vehicle axis A2, i.e., extending between a left side and a right side of the vehicle 22. The cross-vehicle axis A2 and the vehicle-longitudinal axis A1 are perpendicular to each other. The front, rear, left side, and right side may be relative to an orientation of an operator, e.g., the occupant 34, of the vehicle 22. The front, rear, left side, and right side may be relative to an orientation of controls for operating the vehicle 22, e.g., the instrument panel 20, etc. The front, rear, left side, and right side may be relative to a forward driving direction when wheels of the vehicle 22 are all parallel with each other.

Figure 1:
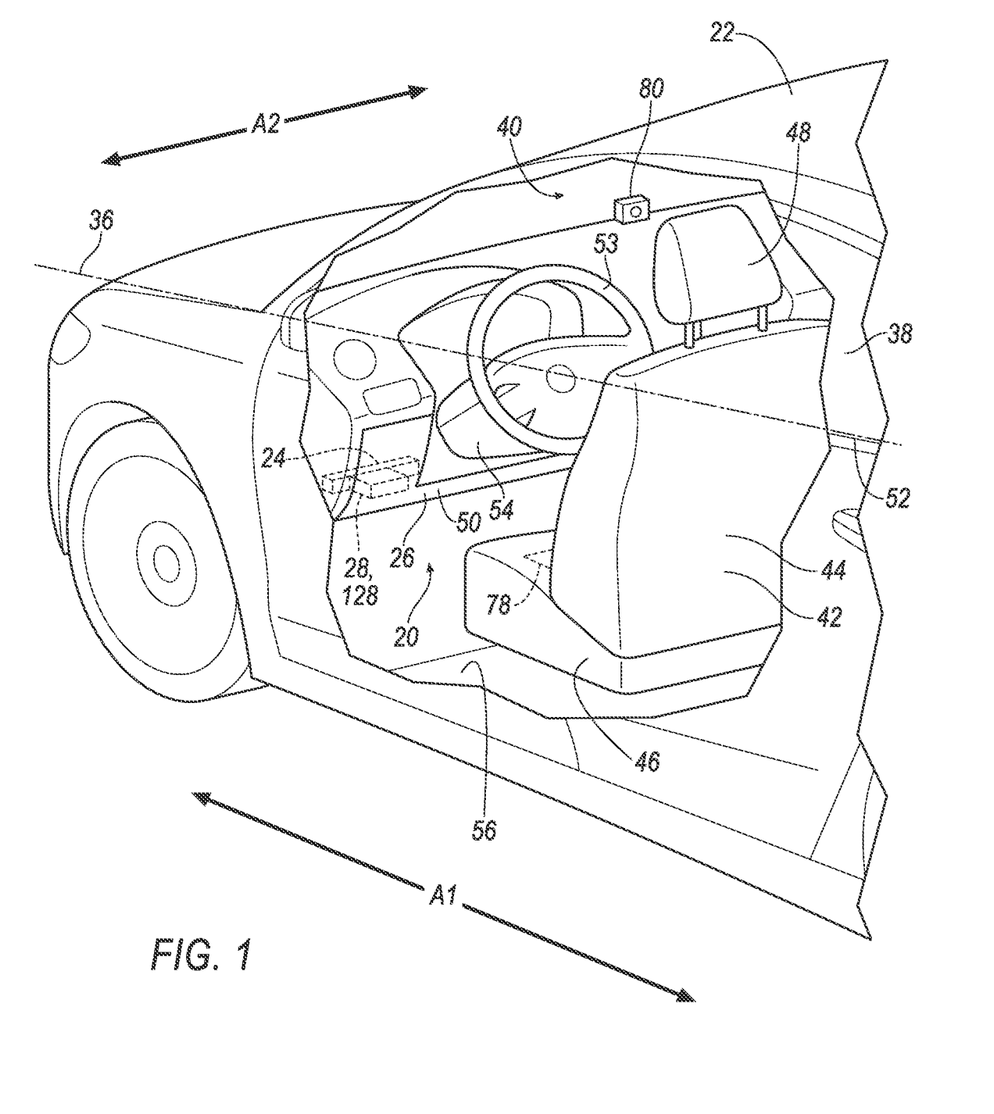
FIG. 1 is a perspective view of a vehicle having an instrument panel assembly.

The vehicle 22 may define a beltline 36, shown in FIG. 1. The beltline 36 extends along the vehicle-longitudinal axis A1. For example, the vehicle 22 may include one or more windows 38, and the beltline 36 may extend along a bottom edge 52 of one or more of the windows 38.

The vehicle 22 includes a passenger cabin 40 to house the occupant 34 of the vehicle 22. The passenger cabin 40 includes one or more seats 42. The seat 42 is shown as a bucket seat, but alternatively the seat 42 may be a bench seat or another type of seat.

The seat 42 may include a seat back 44, a seat bottom 46, and a headrest 48. The headrest 48 may be supported by the seat back 44 and may be stationary or movable relative to the seat back 44. The seat back 44 may be supported by the seat bottom 46 and may be stationary or movable relative to the seat bottom 46. The seat back 44, the seat bottom 46, and/or the headrest 48 may be adjustable in multiple degrees of freedom. Specifically, the seat back 44, the seat bottom 46, and/or the headrest 48 may themselves be adjustable, in other words, adjustable components within the seat back 44, the seat bottom 46, and/or the headrest 48, and/or may be adjustable relative to each other. The seat 42 may be supported by a floor 56 of the vehicle 22. The seat 42 may be in front of the exterior panel 26. To put it another way, an outer surface 50 of the exterior panel 26 may face the seat 42.

The instrument panel 20 may be disposed at a forward end of the passenger cabin 40 and face toward the front seats 42. The instrument panel 20 may include vehicle controls, e.g., a steering wheel 53 and a steering column 54. The steering column 54 transfers rotation of the steering wheel 53 to movement of a steering rack.

The support beam 24 supports other components of the instrument panel 20. The support beam 24 may be elongated along the cross-vehicle axis A2. The support beam 24 may be a component of a frame and/or body of the vehicle 22. The support beam 24 may be metal or any other suitable material.

The exterior panel 26 covers other components of the instrument panel 20. As one example, as shown in the Figures, the exterior panel 26 is a knee bolster. The exterior panel 26 may include the outer surface 50. The outer surface 50 may be a class-A surface, i.e., a surface specifically manufactured to have a high-quality, finished aesthetic appearance free of blemishes. The exterior panel 26 may be below the beltline 36 and/or the steering column 54. To put it another way the exterior panel 26 may be between the floor 56 and the beltline 36 and/or between the floor 56 and the steering column 54.

The energy absorbing device 28, 128, shown in FIGS. 1-6, absorbs energy, e.g., from movement of the occupant 34 during a vehicle impact. The energy absorbing device 28, 128 is between the support beam 24 and the exterior panel 26.

The energy absorbing device 28, 128 has a variable crush resistance based on a temperature of the energy absorbing device 28, 128. To put it another way, an amount of energy absorbed when the energy absorbing device 28, 128 is deformed a certain amount varies as the temperature of the energy absorbing device 28, 128 changes, e.g., a Young's modulus of the energy absorbing device 28, 128 varies as the temperature of the energy absorbing device 28, 128 changes. For example, the crush resistance of the energy absorbing device 28, 128 may be inversely proportional to the temperature of the energy absorbing device 28, 128. To put it another way, an amount of energy absorbed when the energy absorbing device 28, 128 is deformed a certain amount decreases as a temperature of the energy absorbing device 28, 128 increases, and vice versa.

The energy absorbing device 28, 128 may include a first panel 58 and a second panel 60. The first panel 58 and the second panel 60 may be plastic, metal, or any other suitable material or combination of materials. The first panel 58 may be fixed to the support beam 24, e.g., via a fastener, such as a shaft 62 (discussed below), via an adhesive, etc. The second panel 60 may be fixed to the exterior panel 26, e.g., via a fastener, an adhesive, etc. The second panel 60 may be spaced from the first panel 58. The first panel 58 and the second panel 60 may be electrically conductive. For example, the first panel 58 and the second panel 60 may be copper, or any other suitable electrically conductive material. As another example, an electrical conductor, such as a copper plate, may be fixed to the first panel 58 and the second panel 60.

The energy absorbing device 28, 128 may include a member, e.g., a corrugated member 64 (shown in FIGS. 2-4), a block member 66 (shown in FIG. 5), etc., having variable crush resistance based on a temperature of the energy absorbing device 28, 128. The member may be a shape memory polymer (SMP) or any other suitable material. The member may be between the first panel 58 and the second panel 60.

Figure 2:
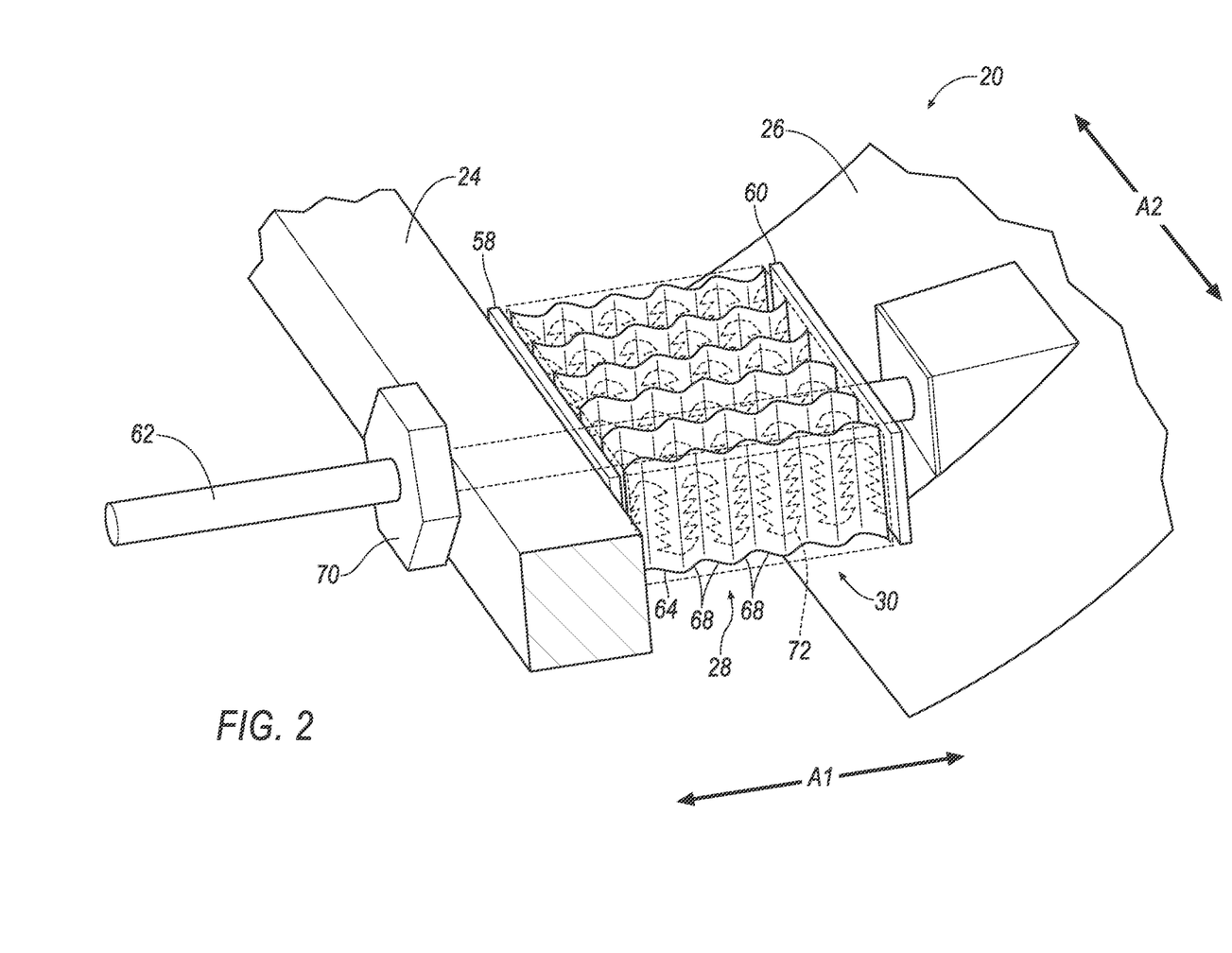
FIG. 2 is a perspective view of a portion of the instrument panel having an energy absorbing device.
Figure 3:
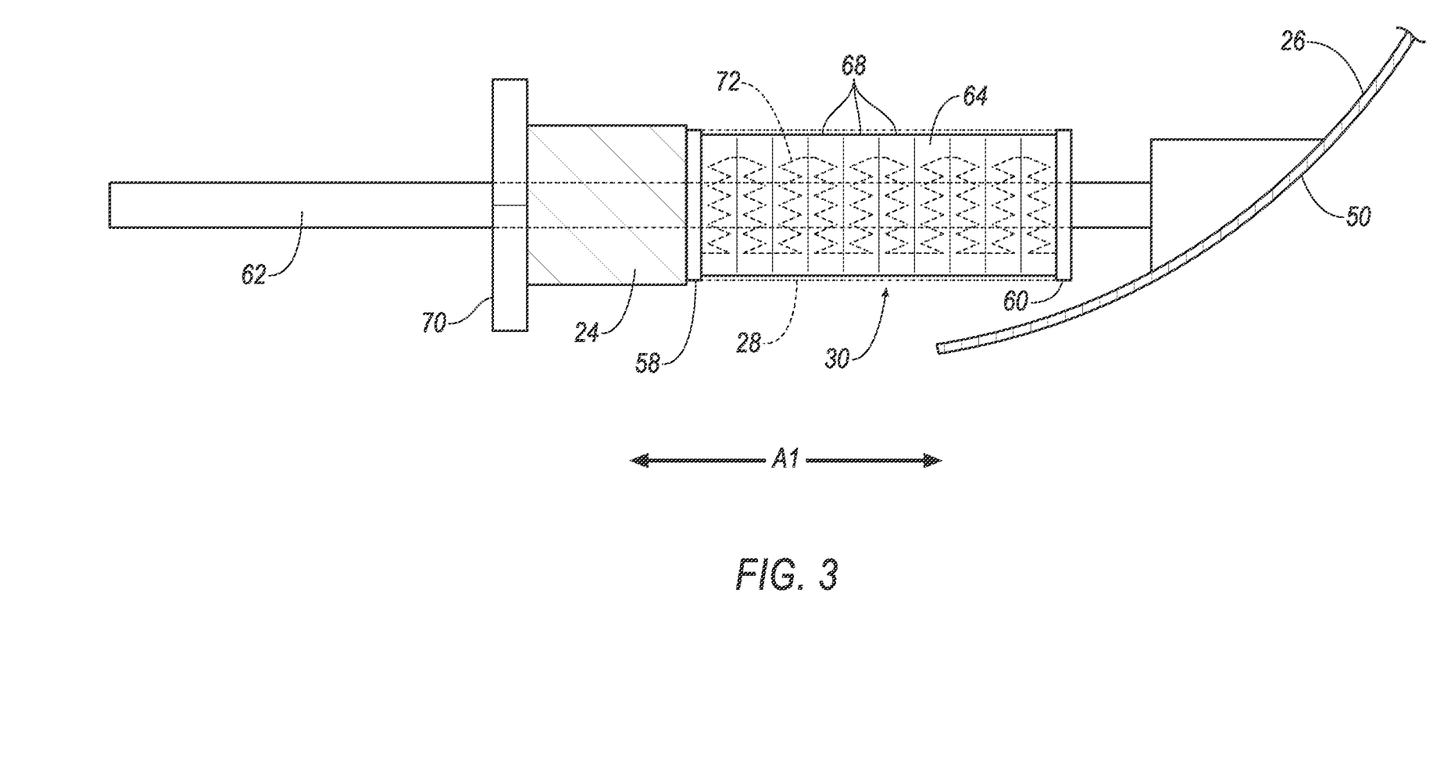
FIG. 3 is a side view of the portion of the instrument panel having the energy absorbing device.
Figure 4:
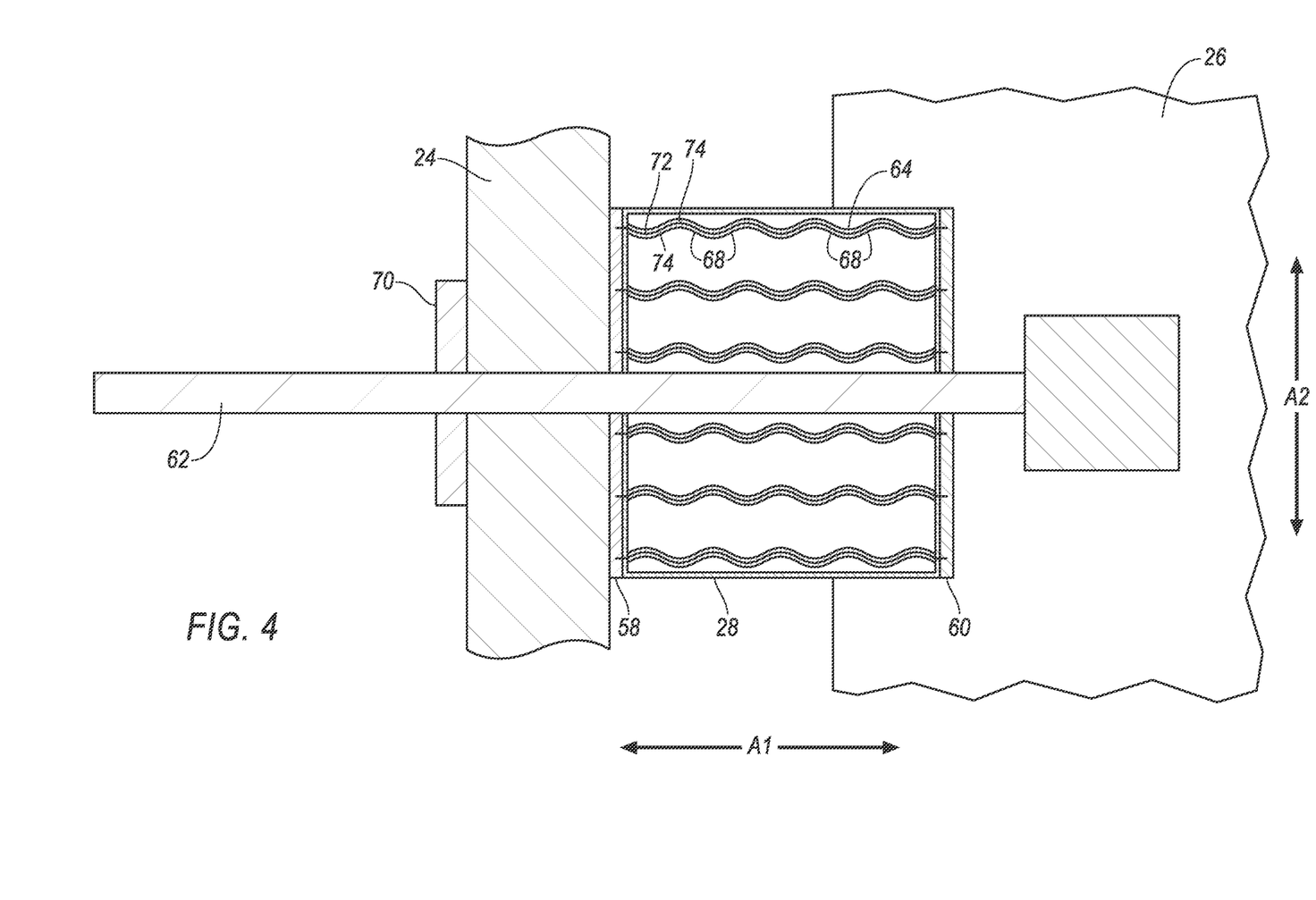
FIG. 4 is a top cross section of the portion of the instrument panel having the energy absorbing device.

With reference to the embodiment of the energy absorbing device 28 shown in FIGS. 2-4, the corrugated member 64 deforms to absorb energy. An amount of energy absorbed by the corrugated member 64 may depend on a frequency, amplitude, orientation, etc., of corrugations 68 of the corrugated member 64. The corrugations 68 may be elongated perpendicular to between the first panel 58 and the second panel 60, as shown in FIGS. 2-4. The corrugations 68 may be elongated between the first panel 58 and the second panel 60 and/or in other orientations (not shown). The corrugated member 64 may be arcuate, e.g., a wave shape, in cross section. The corrugated member 64 may be angular, e.g., a "W" shape, in cross section. The corrugated member 64 may be a combination of arcuate and angular.

Figure 5:
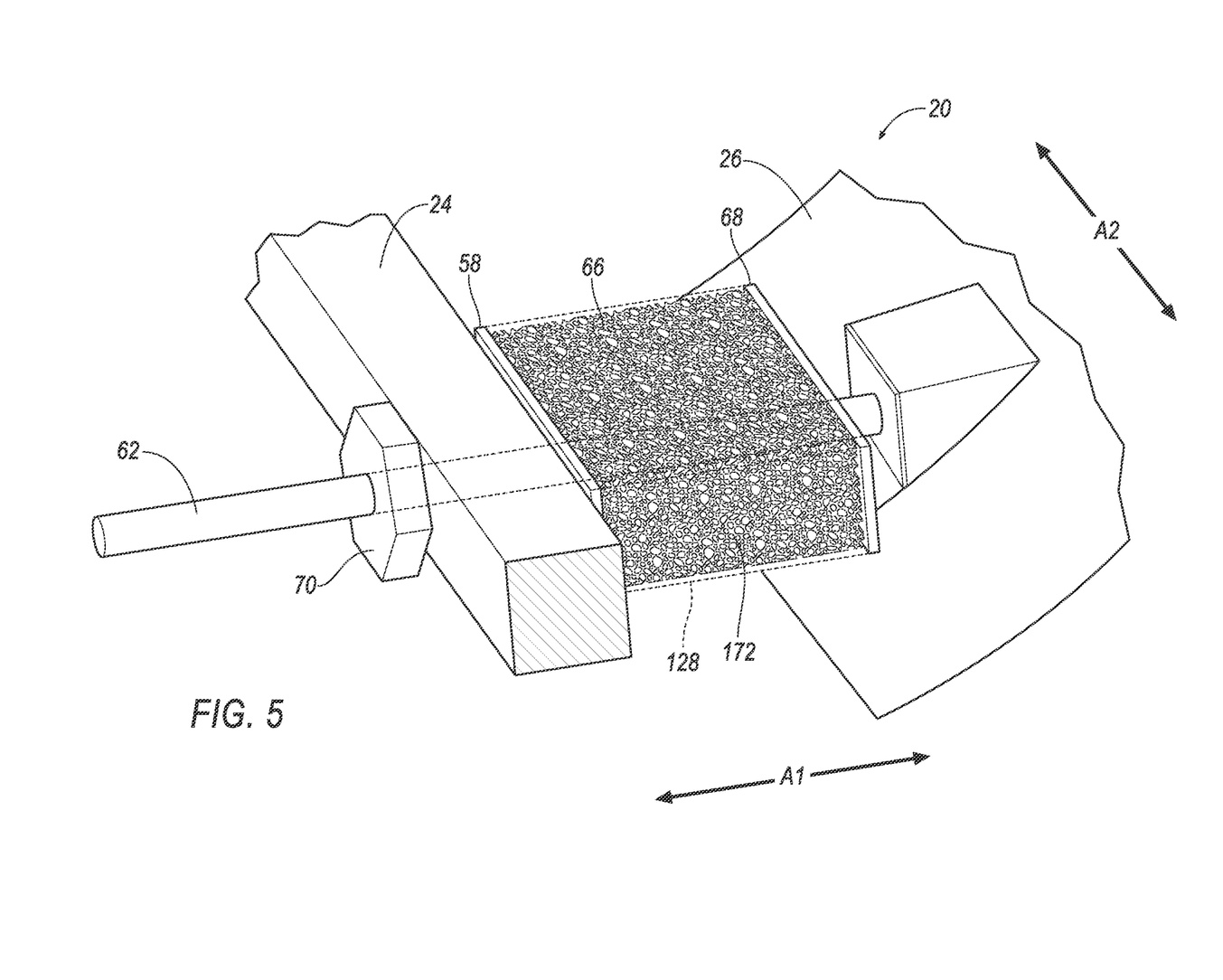
FIG. 5 is a perspective view of a portion of the instrument panel having another embodiment of an energy absorbing device.
Figure 6:
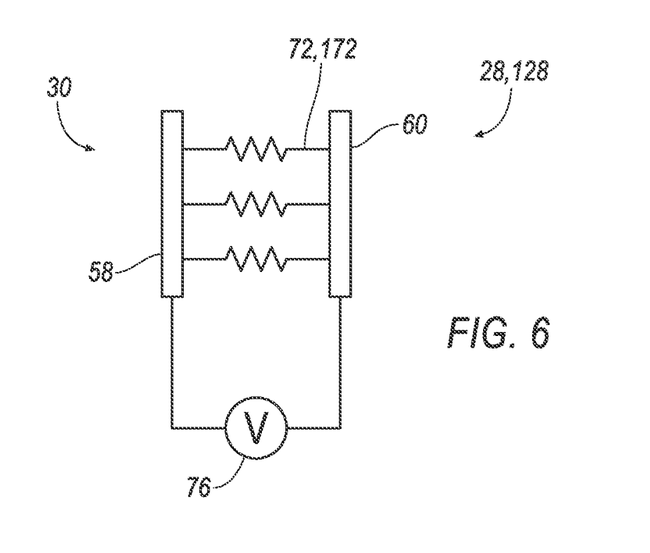
FIG. 6 is a schematic of components of the instrument panel.

With reference to the embodiment of the energy absorbing device 128 shown in FIG. 5, the block member 66 deforms to absorb energy. The block member 66 may be a cuboid, or any other shape.

Returning to the embodiments shown in FIGS. 1-6, the energy absorbing device 28, 128 may be fixed to the support beam 24 and the exterior panel 26. For example, the shaft 62 may extend from the exterior panel 26 to the support beam 24 through the energy absorbing device 28, 128, e.g., through the corrugated member 64 or the block member 66, the first panel 58, the second panel 60, etc. The corrugated member 64 or the block member 66, the first panel 58, and the second panel 60 may be sandwiched between the exterior panel 26 and the support beam 24. For example, the shaft 62 may be threaded and engage a bolt 70, e.g., with the energy absorbing device 28, 128 and the support beam 24 between the exterior panel 26 and the bolt 70. As another example, the shaft 62 may be plastic and may be heat staked at the support beam 24.

The heater 30 generates heat. The heater 30 is operatively coupled to the energy absorbing device 28, 128 to provide the generated heat to the energy absorbing device 28, 128. To put it another way, the heater 30 is fixed relative to the energy absorbing device 28, 128 such that heat energy generated by the heater 30 is transferred to the energy absorbing device 28, 128, e.g., the heater 30 is fixed relative to the corrugated member 64 or the block member 66 such that heat energy may be transferred from the heater 30 via conduction to the corrugated member 64 or the block member 66. For example, the heater 30 and the energy absorbing device 28, 128 may be in physical contact with each other and without a thermal insulator therebetween.

The heater 30 may include a resistor 72, 172. The resistor 72, 172 converts electricity to heat energy. The resistor 72, 172 may be carbon fiber felt, carbon nanotube sponge, or any other suitable structure and/or material.

The resistor 72, 172 may be supported by the energy absorbing device 28, 128, e.g., by the corrugated member 64 or the block member 66. For example, as shown in FIG. 2-4, the resistor 72 may be fixed to the corrugated member 64, e.g., with an adhesive, etc. The resistor 72 may be sandwiched between portions 74 of the corrugated member 64, e.g., carbon fiber felt may be between the portions 74 of the corrugated member 64 along the cross-vehicle axis A2. As another example, as shown in FIG. 5, the resistor 172 may by embedded in the energy absorbing device 128. The resistor 172 may be carbon nanotube sponge may be embedded in the block member 66. To put it another way, the block member 66 may be a polymer molded around the carbon nanotube sponge resistor 172.

The heater 30 may be in electrical communication with the first panel 58 and the second panel 60. To put it another way, the first panel 58 and the second panel 60 may be connected to the heater 30 such that electricity flows through the heater 30 when a voltage is applied across the first panel 58 and the second panel 60, e.g., when a negative electrical lead is connected to the first panel 58 and a positive electrical lead is connected to the second panel 60. For example, the resistor 72, 172 may be soldered, or otherwise electrically coupled, to the first panel 58 and the second panel 60.

The heater 30 may include a power source 76. The power source 76 provides electricity that is converted to heat by the heater 30. For example, the power source 76 may be a battery, e.g., one or more of a lithium-ion battery, a nickel-metal hydride battery, a lead-acid battery, or other device(s) capable of receiving, storing, and proving electrical energy. The battery may be a component of the vehicle 22, e.g., a vehicle battery in an engine compartment and used to power other vehicle components, such as a starter motor, etc. The power source 76 may be in electrical communication with the energy absorbing device 28, 128, e.g., with the first panel 58 and the second panel 60.

The vehicle 22 may include one or more occupancy sensors 78, 80. The occupancy sensors 78, 80 are configured to detect a size of an occupant 34 seated in front of the exterior panel 26. For example, the occupancy sensor 78, 80 may be a weight sensor 78 supported by the seat 42 in front of the exterior panel 26, e.g., supported by the seat bottom 46 of such seat 42. As another example, the occupancy sensor 78, 80 may be a camera 80 positioned to capture images of the passenger cabin 40, e.g., supported by the instrument panel 20, a roof, a windshield, or any other suitable location of the vehicle 22, and positioned to capture an image of the occupant 34 of the seat 42 in front of the exterior panel 26.

The vehicle 22 may include a communication network 82. The communication network 82 includes hardware, such as a communication bus, for facilitating communication among vehicle components such as the heater 30, the computer 32, the occupancy sensor 78, 80, the power source 76, etc. The communication network 82 may facilitate wired or wireless communication among the vehicle components in accordance with a number of communication protocols such as controller area network (CAN), Ethernet, WiFi, Local Interconnect Network (LIN), and/or other wired or wireless mechanisms.

Figure 7:
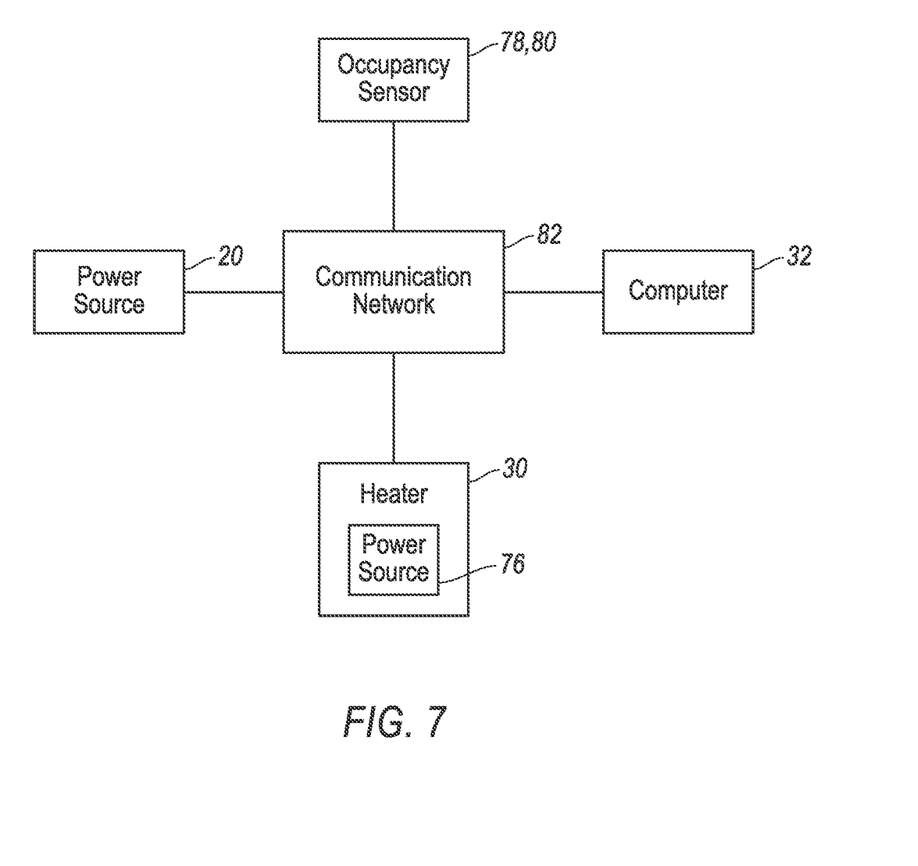
FIG. 7 is a block diagram of components of the vehicle.

The computer 32 may be a microprocessor based computer implemented via circuits, chips, or other electronic components. For example, the computer 32 may include a processor, a memory, etc. The memory of the computer 32 may include memory for storing programming instructions executable by the processor as well as for electronically storing data and/or databases. Although shown as one computer in FIG. 7, it is to be understood that the computer 32 may include multiple computing devices.

Figure 8:
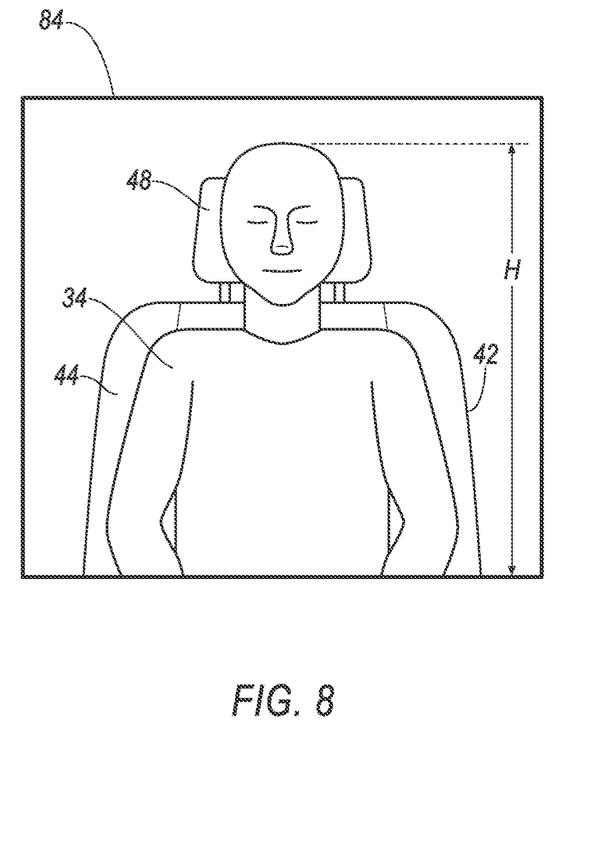
FIG. 8 is an example image captured by a camera of the vehicle.

The computer 32 may be programmed to detect a size of the occupant 34 seated in front of the exterior panel 26, e.g., based on information from the occupancy sensor 78, 80. For example, the computer 32 may receive information from the weight sensor 78 supported by the seat 42 in front of the exterior panel 26 indicating a weight of such occupant 34. As another example, the computer 32 may receive information from the camera 80, e.g., an image of the occupant 34 seated in the seat 42 in front of the exterior panel 26. The computer 32 may analysis the image using image recognition techniques to identify a height H of the occupant 34, e.g., relative to a frame 84 of the image, etc., as shown in FIG. 8.

The computer 32 may be programmed to heat the energy absorbing device 28, 128. For example, the computer 32 may transmit an instruction to the heater 30 via the communication network 82. The instruction may indicate a temperature and/or a temperature analog. For example, the instruction may indicate a voltage of electricity to provide to the resistor 72, 172 from the power source 76, e.g., the computer 32 may indicate a higher temperature by instructing a higher voltage be supplied to the resistor 72, 172. As another example, the instruction may indicate a duty cycle of pulse width modulation of electricity to provide to the resistor 72, 172, e.g., the computer 32 may indicate a higher temperature by instructing an increase in an amount of time in which electricity is supplied to the resistor 72, 172, and a decrease in an amount of time in which electricity is not supplied to the resistor 72, 172.

The computer 32 may be programmed to heat the energy absorbing device 28, 128 based on the detected size of the occupant 34 seated in front of the exterior panel 26. Heating the energy absorbing device 28, 128 based on the detected size of the occupant 34 in front of the exterior panel 26 enables the energy absorbing device 28, 128 to have a crush resistance that corresponds with the size of the occupant 34, e.g., a lower crush resistance for a smaller occupant 34 or a higher crush resistance for a larger occupant 34. The computer 32 may actuate the heater 30 to heat the energy absorbing device 28, 128 inversely to the detected size of the occupant 34. For example, the computer 32 may heat the energy absorbing device 28, 128 to a first temperature upon detecting an occupant having a first size, and heat the energy absorbing device 28, 128 to a second temperature that is greater than the first temperature upon detecting an occupant having a second size that is less than the first size. As another example, the computer 32 may store a lookup table or the like associating various sizes of occupants, e.g., weights, heights, etc., with various temperatures and/or temperature analogs, e.g., voltages, duty cycles, etc., of electricity to provide to the resistor 72, 172. Greater weights and/or heights are associated with lower heating, and vice versa. An example lookup table is shown below:

TABLE 1

| Detected Weight (Pounds) | Voltage to Provide to Resistor (Volts) |
|---|---|
| <110 | 12 |
| 110-170 | 8 |
| 171-220 | 4 |
| >220 | 0 |

The lookup table may be populated based on empirical testing, e.g., the vehicle 22 may be crash tested with various sized crash test dummies and with power to the resistor 72, 172 supplied at various voltages, duty cycles, etc., e.g., such that an optimum temperature and/or temperature analog may be identified for use with each of the various sized crash test dummies.

Figure 9:
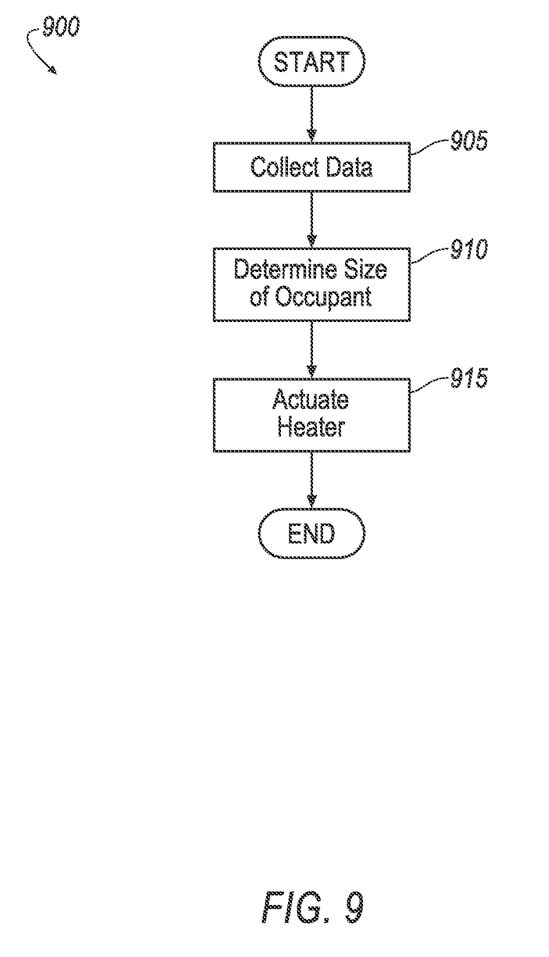
FIG. 9 is a process for controlling the temperature of the energy absorbing device.

FIG. 9 is a process flow diagram illustrating an exemplary process 900 for controlling the temperature of the energy absorbing device 28, 128. The process 900 begins in a block 905 where the computer 32 receives information from vehicle components, e.g., from the occupancy sensor 78, 80. The computer 32 may receive information throughout the process 900. Throughout the process 900 in the present context means substantially continuously or at time intervals, e.g., every 100 milliseconds.

Next at a block 910 the computer 32 identifies a detected size of the occupant 34 seated in front of the exterior panel 26, e.g., based on information from the occupancy sensor 78, 80. For example, the computer 32 may identify the weight, the height, etc., of the occupant 34, e.g., as described herein.

Next at a block 915 the computer 32 actuates the heater 30 to the heat the energy absorbing device 28, 128 based on the detected size from the block 910. For example, the computer 32 may transmit an instruction to the heater 30 via the communication network 82, e.g., as described herein. The computer 32 may continue to heat the energy absorbing device 28, 128 until a different occupant is detected, e.g., having a different detected height and/or weight, until no occupant is detected, etc. After the block 915 the process 900 may end. Alternately, the process 900 may return to the block 905.

Computing devices, such as the computer 32, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An instrument panel assembly, comprising:
a support beam;
an exterior panel;
an energy absorbing device between the support beam and the exterior panel and having a variable crush resistance based on a temperature of the energy absorbing device, the crush resistance of the energy absorbing device being inversely proportional to the temperature of the energy absorbing device; and
a heater having a resistor embedded in the energy absorbing device.

2. The instrument panel assembly of claim 1, wherein the heater includes a power source in electrical communication with the energy absorbing device.

3. The instrument panel assembly of claim 1, wherein the energy absorbing device includes a corrugated member.

4. The instrument panel assembly of claim 1, wherein the energy absorbing device includes a first panel fixed to the support beam, a second panel fixed to the exterior panel and spaced from the first panel, and a material having variable crush resistance based on a temperature of the energy absorbing device between the first panel and the second panel.

5. The instrument panel assembly of claim 4, wherein the first panel and the second panel are electrically conductive and the heater is in electrical communication with the first panel and the second panel.

6. The instrument panel assembly of claim 1, further comprising a shaft extending from the exterior panel to the support beam through the energy absorbing device.

7. The instrument panel assembly of claim 1, wherein the resistor includes a carbon nanotube sponge.

8. A vehicle, comprising: a support beam; an exterior panel; a heater in communication with a processor and operatively coupled to an energy absorbing device; the energy absorbing device between the support beam and the exterior panel and having a variable crush resistance based on a temperature of the energy absorbing device, and the processor and a memory storing instructions executable by the processor to heat the energy absorbing device based on a detected size of an occupant seated in front of the exterior panel, wherein the memory further stores instructions executable by the processor to actuate the heater to heat the energy absorbing device to a first temperature upon detecting an occupant having a first size, and to actuate the heater to heat the energy absorbing device to a second temperature that is greater than the first temperature upon detecting an occupant having a second size that is less than the first size.

9. The vehicle of claim 8, further comprising an occupancy sensor in communication with the processor and configured to detect a size of an occupant seated in front of the exterior panel.

10. The vehicle of claim 8, wherein the support beam is elongated along a cross-vehicle axis.

11. The vehicle of claim 8, further comprising a seat in front of the exterior panel.

12. The vehicle of claim 11, further comprising a weight sensor in communication with the processor and supported by the seat.

13. The vehicle of claim 10, wherein the exterior panel is below a beltline.

14. The vehicle of claim 10, further comprising a steering column, and the exterior panel is below the steering column.

15. The vehicle of claim 8, wherein the energy absorbing device includes a first portion and a second portion, and the heater includes a resistor between the first portion and the second portion.

16. An instrument panel assembly, comprising:
a support beam;
an exterior panel;
an energy absorbing device between the support beam and the exterior panel and having a variable crush resistance based on a temperature of the energy absorbing device, the energy absorbing device includes a first panel fixed to the support beam, a second panel fixed to the exterior panel and spaced from the first panel, and a material having variable crush resistance based on a temperature of the energy absorbing device between the first panel and the second panel; and
a heater operatively coupled to the energy absorbing device.

17. The instrument panel assembly of claim 16, wherein the first panel and the second panel are electrically conductive and the heater is in electrical communication with the first panel and the second panel.

* * * * *

UNITED STATES PATENT AND TRADEMARK OFFICE
CERTIFICATE OF CORRECTION

PATENT NO. : 10,759,370 B2
APPLICATION NO. : 15/956163
DATED : September 1, 2020
INVENTOR(S) : Yali Li et al.

Page 1 of 1

It is certified that error appears in the above-identified patent and that said Letters Patent is hereby corrected as shown below:

In the Claims

Column 10, in Line 8, replace "The vehicle of claim 10, wherein" with — The vehicle of claim 8, wherein —.

Column 10, in Line 10, replace "The vehicle of claim 10, further" with — The vehicle of claim 8, further —.

Signed and Sealed this
Eighth Day of December, 2020

Andrei Iancu
*Director of the United States Patent and Trademark Office*